(12) United States Patent
Mickiewicz

(10) Patent No.: US 12,416,476 B2
(45) Date of Patent: Sep. 16, 2025

(54) BALLISTIC SHIELD ASSEMBLY

(71) Applicant: Dean Chester Mickiewicz, Helena, AL (US)

(72) Inventor: Dean Chester Mickiewicz, Helena, AL (US)

(*) Notice: Subject to any disclaimer, the term of this patent is extended or adjusted under 35 U.S.C. 154(b) by 0 days.

(21) Appl. No.: 18/179,918

(22) Filed: Mar. 7, 2023

(65) Prior Publication Data
US 2024/0302140 A1    Sep. 12, 2024

(51) Int. Cl.
*F41H 5/08* (2006.01)
*F16M 11/02* (2006.01)
*F16M 11/20* (2006.01)

(52) U.S. Cl.
CPC .............. *F41H 5/08* (2013.01); *F16M 11/02* (2013.01); *F16M 11/2021* (2013.01); *F16M 11/2092* (2013.01)

(58) Field of Classification Search
CPC ...... F41H 5/08; F16M 11/02; F16M 11/2021; F16M 11/2092
USPC ........................................................ 89/36.07
See application file for complete search history.

(56) References Cited

U.S. PATENT DOCUMENTS

| | | | | |
|---|---|---|---|---|
| 1,279,571 A | * | 9/1918 | Moloney | F41H 5/08 2/2.5 |
| 8,967,031 B2 | * | 3/2015 | Mulcahey | F41H 1/00 89/36.06 |
| 11,614,303 B1 | * | 3/2023 | Ancona | F41H 5/12 89/36.07 |
| 2003/0110933 A1 | * | 6/2003 | Baker | F41H 5/08 89/36.05 |
| 2005/0217472 A1 | * | 10/2005 | Baker | F41H 5/08 89/36.06 |
| 2013/0098234 A1 | * | 4/2013 | Armellino, Jr. | F41H 5/08 89/926 |
| 2014/0233235 A1 | * | 8/2014 | Micarelli | F41H 5/08 362/253 |
| 2015/0233679 A1 | * | 8/2015 | Seabrook | F41A 27/10 89/36.07 |
| 2017/0167826 A1 | * | 6/2017 | Spransy | F41C 27/04 |
| 2018/0017360 A1 | * | 1/2018 | Adamow | F41H 5/26 |
| 2019/0145741 A1 | * | 5/2019 | Spransy | F41H 5/013 89/36.05 |
| 2021/0063119 A1 | * | 3/2021 | Spychalski | F41A 23/02 |
| 2021/0404773 A1 | * | 12/2021 | Swain | F41H 5/08 |
| 2023/0417513 A1 | * | 12/2023 | Boydd | F41H 5/013 |

FOREIGN PATENT DOCUMENTS

WO    WO-2013115880 A2 *  8/2013  .............. F41C 27/04

* cited by examiner

Primary Examiner — Samir Abdosh

(57) ABSTRACT

This invention solves the problem of a ballistic shield laying further away from the user when using a long gun by placing a support arm in the direction away from the user. The arm provides the forward support and balance to the long gun. This invention also solves the problem of having fasteners which attach the handle, carrying straps and related hardware directly exposed to incoming bullets by using a detachable ballistic panel assembly.

13 Claims, 10 Drawing Sheets

BALLISTIC SHIELD ASSEMBLY

RELATED APPLICATIONS

Provisional application No. 63/372,467, filed on Mar. 15, 2022 and now abandoned.

BACKGROUND OF THE INVENTION

1. Field of the Invention

The present invention is for man portable (hand held ballistic shields), but may be used for non man portable shields.

2. Description of Related Art

Ballistic shields are used anywhere that a ballistic threat is possible. The main users are security, law enforcement and military. Typically ballistic shields are not meant to replace personal body armor (such as vests), but to add additional protection over areas not protected by a vest and to provide additional protection over areas already protected by the user's body armor.

Ballistic shields (ballistic plates designed to stop or significantly reduce the trauma from high velocity projectiles-such as bullets) are typically one piece. Shields for coverage over the head and chest areas are usually larger and heavy enough such that they are not carried for routine use and thus not available when the threat occurs.

Extended boy (Head and chest front, pubic region front, upper leg) coverage with existing ballistic shields usually are large one piece shields. Shields of this type must be stored in larger containment areas, such as the trunk of a police car. Smaller ballistic shields (for head and neck protection) do not exist that can also have other ballistic plates (such as an extension panel to increase ballistic coverage) attached later for extended body (if needed) coverage.

Currently, ballistic shield manufacturers have come up with their own methods of supporting a long gun with a ballistic shield, and making holding the weight of the shield easier. One manufacturer has a backpack with a rigid arm cantilevered from the backpack, over the head of the user and attached to the shield, to support its weight. This manufacturer uses the shield as the second support point to support and balance the weight of the long gun. Thus, the shield must be placed further away from the user's body, which then provides less coverage to the user.

Ballistic shields are typically of a one piece construction. The ballistic material is directly connected to the handle, nameplate and similar features such that if a bullet hit the fastener which connected the handle to the ballistic material, the handle may become loose and cause the shield to fall.

SUMMARY OF THE INVENTION

In accordance with this invention, there is a least one ballistic plate which contains ballistic material. This ballistic plate may have a handle and typical features found on many ballistic shields, such as a viewport. The ballistic plate may only have features to connect to a secondary plate. This secondary plate (base plate) may contain the handle, connections to carrying straps and other features found on ballistic shields.

On the back side (non-impact side) of the ballistic plate are placed components which enable the main ballistic plate to be fastened to the base plate. These components may be attached to the main ballistic plate by fasteners as long as the fasteners are not protruding through the entire main ballistic plate such that they are not directly exposed to the impact of bullets. Other means of attaching the components to the main ballistic plate, such as gluing or using epoxy resins are acceptable.

A further implementation with this invention is the space between the main ballistic plate and the base plate. This gap creates space armor, a useful component of many armor systems. The armor is removeable such that it can be replaced in the field and the other components of the ballistic shield mounted on the base plate, such as the handle can be used again after the main ballistic plate has been degraded due to stopping bullets.

One plate, either ballistic or an attached plate, has a structural member attached to it which is to be used as a support point for a long gun. This structural member supports the weight of the long gun at a point at least 2.5 inches away from the main ballistic plate, in the same direction as the long gun is aiming.

A further implementation of this invention is the close proximity of the user's hand holding the shield to the user's body. When the user is holding both the shield in one hand and the long gun with the other hand, the hand holding the handle of the shield may be in closer proximity to the user's chest, when the user is aiming the long gun with the structural member supporting and balancing the weight of the long gun.

Another implementation coherent with the principles of this invention is that the structural support arm for the long gun may be adjustable in length and can rotate for storage.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION

The invention described with reference to accompanying drawings, has at least one illustrative representation shown.

This invention may be illustrated in different morphologies and should not be construed as limited to the representations contained in this document. The illustrations herewith are not limiting as to the scope of the invention.

Terms may be used interchangeably, unless made expressively clear from the text. The terms "ballistic panel", "plate" or "ballistic plate" shall be used interchangeably unless specifically made distinguishable from text. The term "ballistic shield" shall mean a ballistic plate with at least one additional item attached to it. Some terms such as "connector" or "fastener" shall be deemed understandable by someone with proficient skills in this art. Some drawings views may have some items missing from an actual ballistic shield. Not having all items in every drawing view is done for clarity and understanding of the entities on that drawing.

Figure 1:
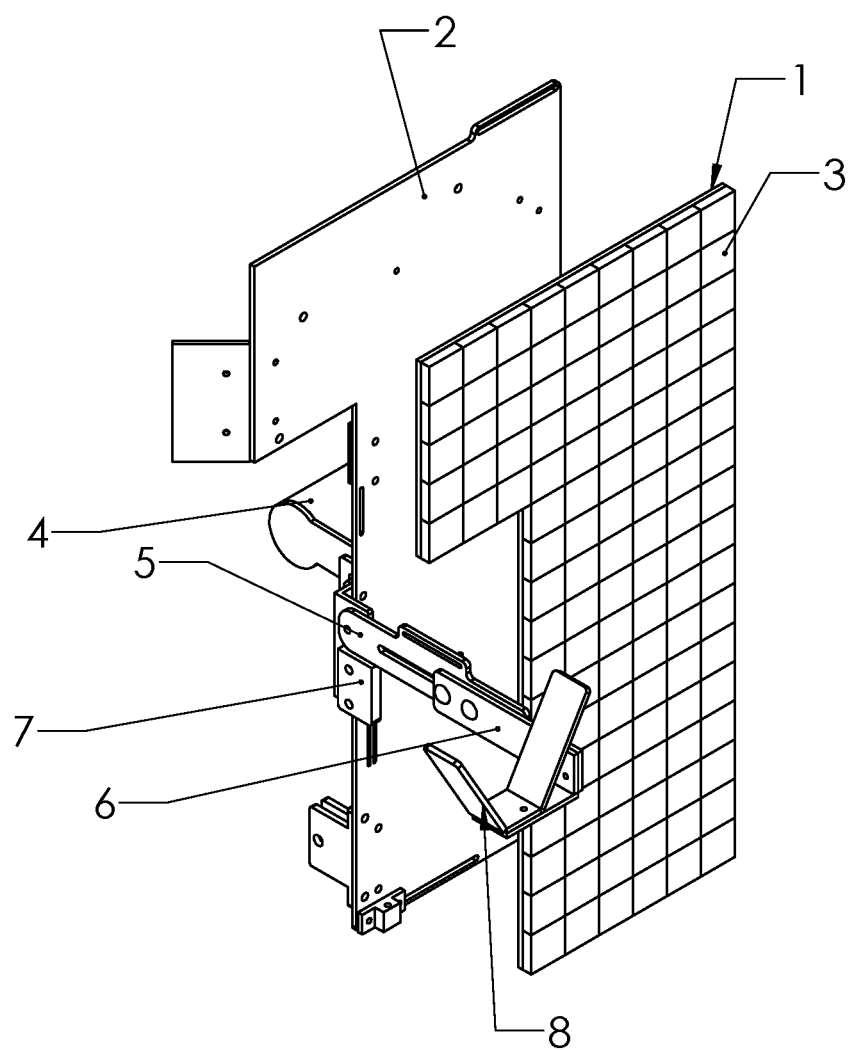
FIG. 1 is an exploded front perspective view of the ballistic shield of the present invention including the long gun support.
Figure 4:
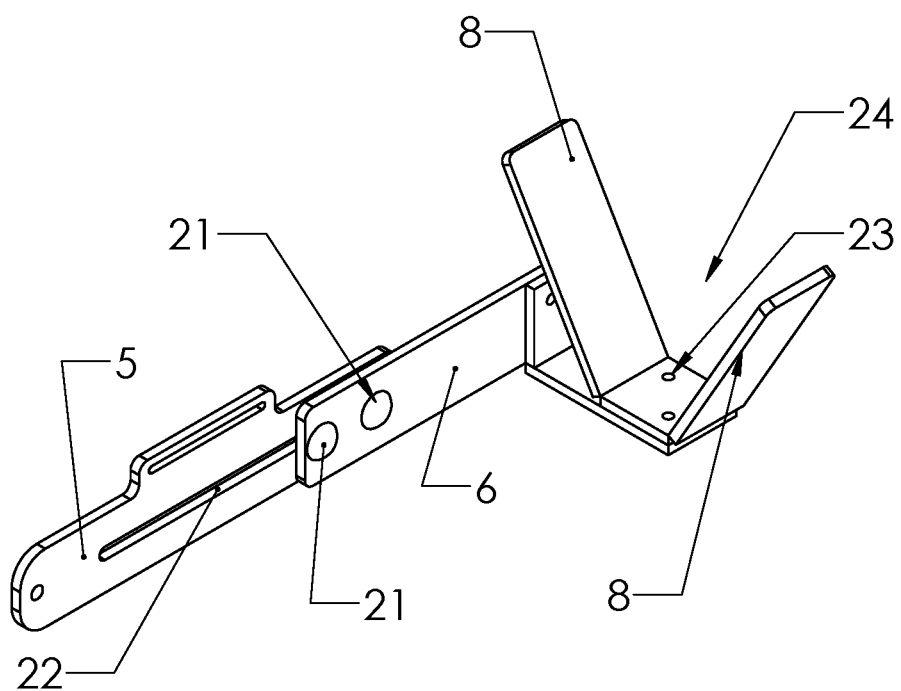
FIG. 4 is a detailed perspective view of the long gun support of the present invention in the extended or deployed position.

As shown in FIG. 1, a ballistic shield assembly comprises a backing plate 1, a base plate 2, a ballistic plate 3, a handle 4, a proximal support member 5, a distal support member 6 and a stop plate 7. The ballistic plate 3 in these embodiments shall be made of material sufficient for the threat level designed to counter. Together the backing plate 1 and ballistic plate 3 form a protective ballistic shield. Also because this is primarily designed to be man portable (carried by hand or on rollers), the weight of the ballistic materials is a prime consideration. For National Institute of Justice (NIJ) level 3A and NIJ level 3, a polymer based material made of aramid, para-aramid or polypropylene is recommended. However for NIJ 4 shields, steel laminate plates with high hardness and ceramic plate composites are recommended. The long gun support comprises one or more support members to support and balance the weight of the long gun. In FIG. 1, the long gun support is showed as the proximal and distal support members 5 and 6. Any means of rotatably attaching the proximal support member 5 to the base plate 2 or any ballistic plate 3 is acceptable. FIG. 1 shows a stop plate 7 used to keep the long gun support structural members 5 and 6 substantially perpendicular to the ballistic plate 3 when extended or deployed as best shown in FIGS. 1, 2 and 4.

Figure 2:
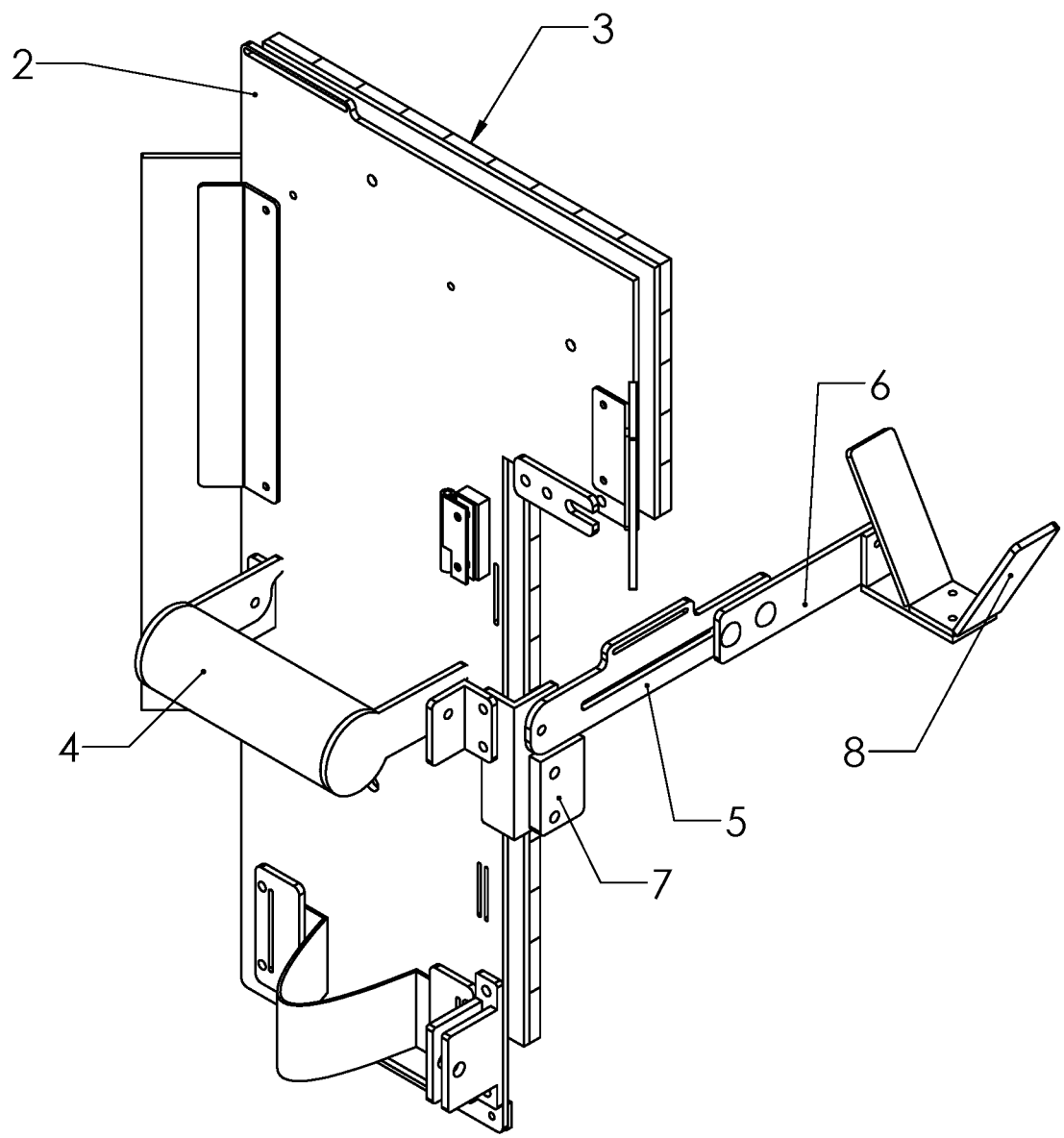
FIG. 2 is a rear perspective view of the ballistic shield of the present invention including the long gun support in the deployed position.

FIG. 2 shows a perspective view of the ballistic shield assembly with the long gun support in the extended or deployed position. A distal barrel support is attached to the distal end portion of the distal support member 6 to prevent or minimize lateral sliding or shifting of the long gun. If the long gun support is fixed and non-rotating relative to the base plate 2, the stop plate 7 is not needed.

Figure 3:
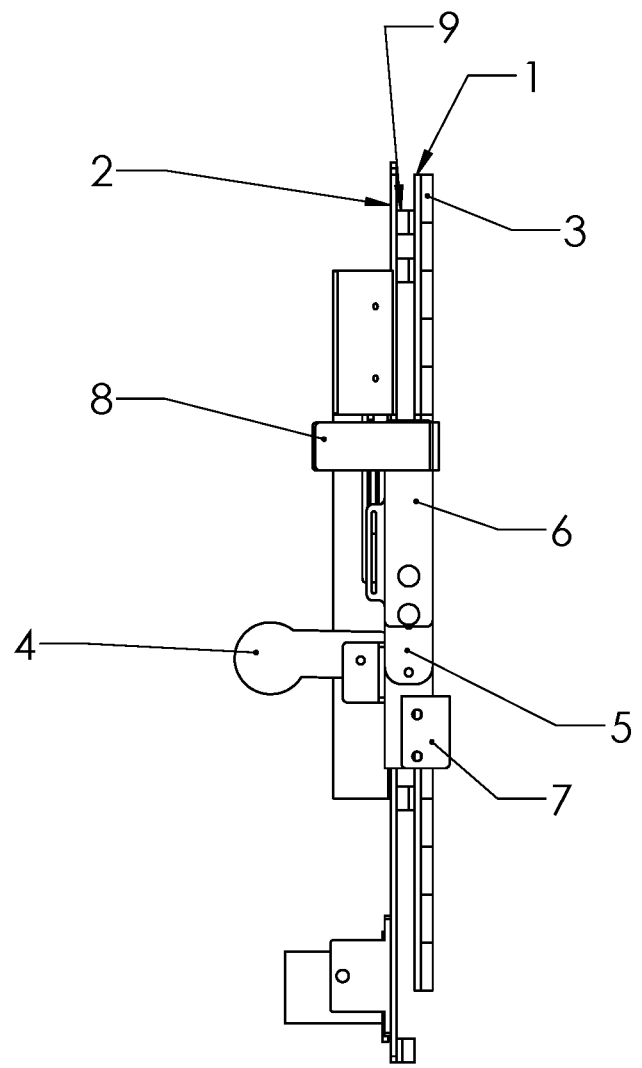
FIG. 3 is a side view of the ballistic shield of the present invention including the long gun support in the retracted or stowed position.

FIG. 3 shows the ballistic shield assembly with the long gun support retracted or stowed.

Figure 5:
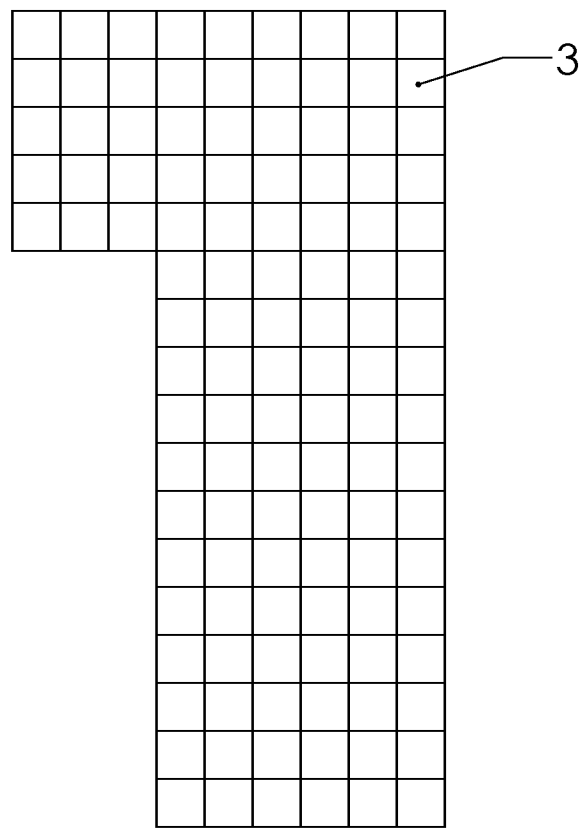
FIG. 5 is a front view of the ballistic plate of the present invention.

As shown in FIG. 5, the ballistic plate 3 comprises a number of squares or elements such as ceramic tiles. The impact side does not have to have ceramic tiles, any ballistic material can be used. Note that there are no fasteners such as bolts piercing through the ballistic material and directly exposed to incoming bullets.

Figure 6:
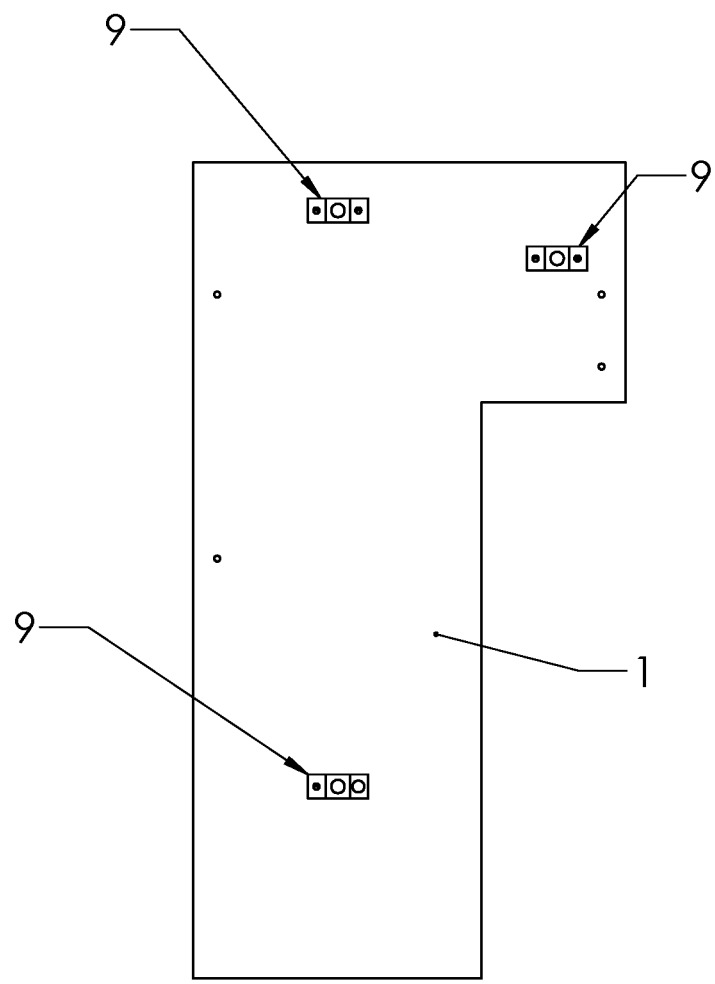
FIG. 6 is a rear view of the back plate of the present invention.

As shown in FIGS. 1 through 3, the backing plate 1 is secured to ballistic material of the ballistic plate 3. One possible configuration for attachment to ballistic components of the ballistic plate 3 is to provide an outside wrap using a resin impregnated cloth to contain the backing plate 1 and other ballistic materials. As shown in FIG. 6, the backing plate 1 has at least one connector 9 to connect the backing plate 1 to the base plate 2.

Figure 7:
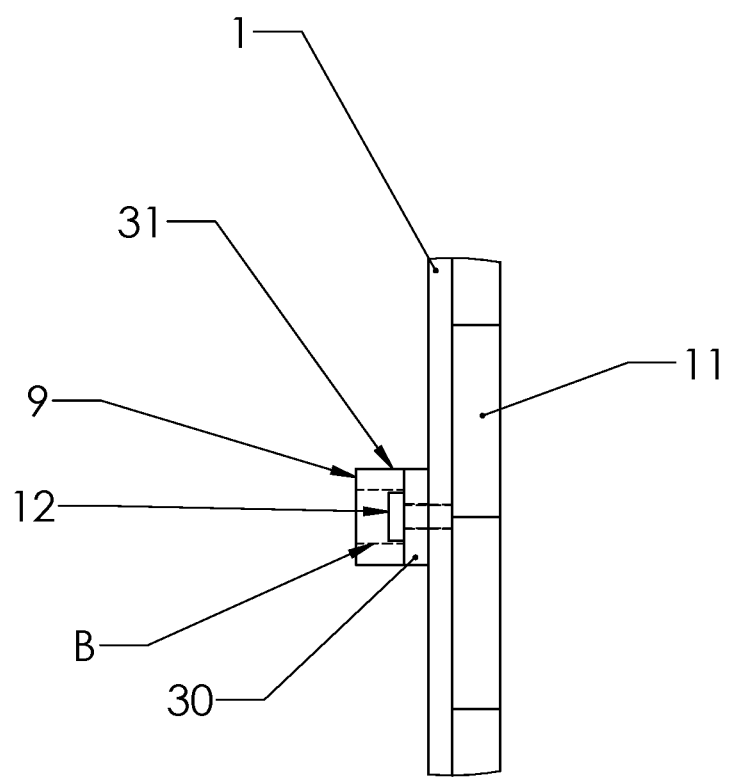
FIG. 7 is a partial side view of the ballistic shield of the present invention.

FIG. 7 shows a side view of a connector 9 attached to the backing plate 1. The connector 9 is attached with a fastener 12 such as a rivet to the backing plate 1. The fastener 12 does not project through the ballistic material 11 of the ballistic plate 3. There is no gap between the backing plate 1 and ballistic material 11.

Figure 8A:
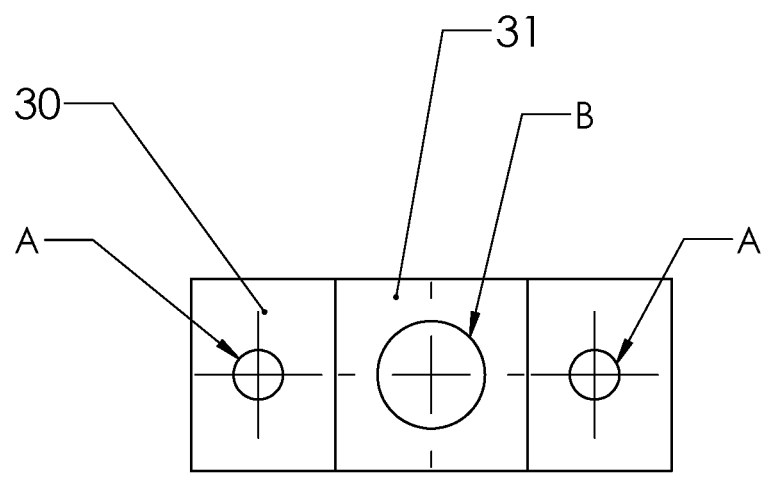
FIG. 8A is a view of the back plate connector of the present invention.
Figure 8B:
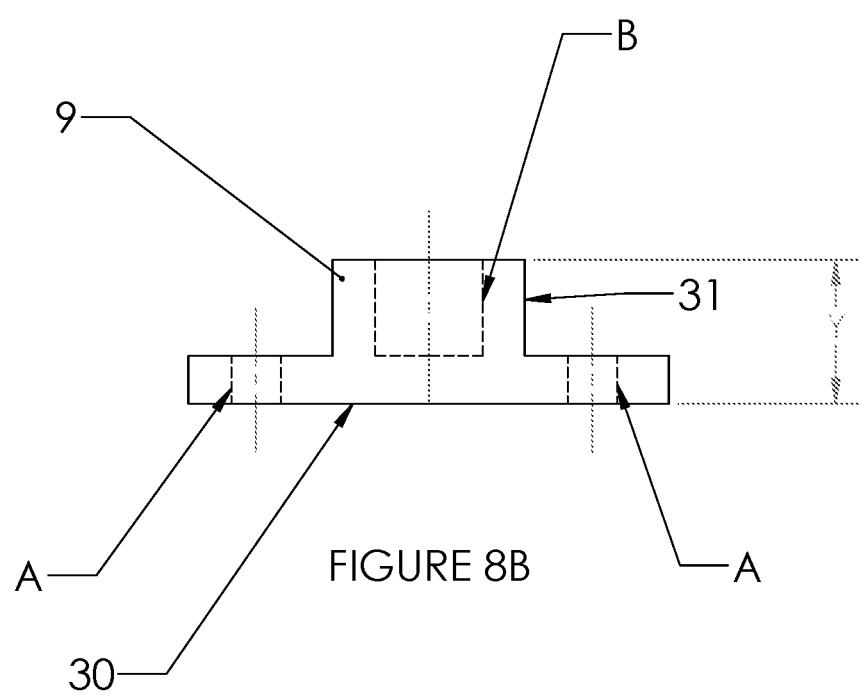
FIG. 8B is a side view of the back plate connector of the present invention.

FIGS. 8A and 8B shows one configuration of the connector 9. Holes or openings A are used to attach the connector 9 to the backing plate 1 and recess B is used to couple the base plate 2 to the backing plate 1. Distance Y is the height of the connector 9 and the width of the gap between the backing plate 1 and the base plate 2.

Figure 9:
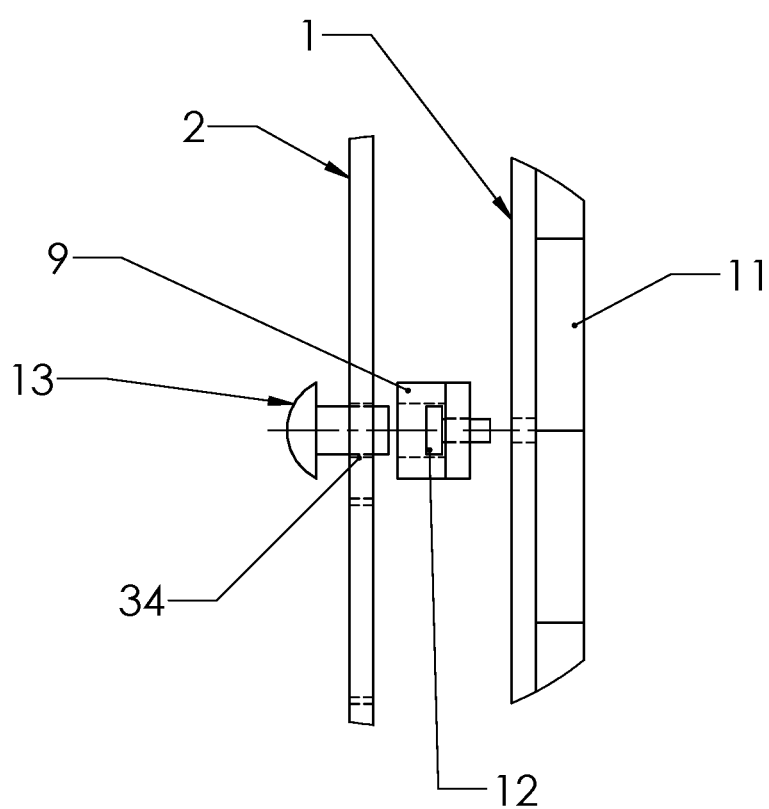
FIG. 9 is an exploded side view of the connector assembly of the present invention.

FIG. 9 shows a partially exploded side view of the ballistic shield assembly with the base plate 2 secured in spaced relationship to the backing plate 1 by fastener 13 and the connector 9.

As shown in FIGS. 2 through 4, the long gun support comprises the proximal support member 5 pivotally or rotatably coupled to the base plate 2 by a pin 20 and the distal support member 6 slidably mounted to the proximal support member 5 by a pair of pins each indicated as 21 extending through a longitudinal slot 22 formed through the proximal support member 5. The proximal support member 5 and the distal support member 6 can also pivot to extend instead of sliding.

As best shown in FIGS. 1, 2 and 4, a barrel support to support the distal portion of the barrel of a long gun is attached to the distal portion of the distal support member 6. A retainer or limit 8 extends upwardly from each side portion of the barrel support plate 23 to form a channel 24 to restrict side to side or lateral movement of the gun barrel supported by the barrel support plate 23 when a person holding the ballistic shield assembly is aiming the long gun thereby stabilizing the long gun. The support to support the distal portion of the barrel of a long gun can be of a non'V shape, such as a semicircle.

As shown in FIGS. 7, 8A, 8B and 9, the connector 9 comprises a base 30 have a post or protrusion 31 extending outwardly therefrom. The openings or holes A are formed through the base 30 to receive fasteners 12 therethrough to secure the connector 9 to the backing plate 1. The recess B is formed in the post or protrusion 31 to receive a fastener 13 extending through a opening or hole 34 formed in the base plate 2 to detachably attach the backing plate 1 to the back plate 2. Of course, the connector 9 may be affixed or attached to the backing plate 1 by an adhesive or other means such as welding.

In use, the long gun support is deployed by rotating the proximal support member 5 and distal support member 6 from the vertical position (FIG. 3) to the horizontal position. The lower surface of the proximal support member 5 engages the upper surface of the stop 7 to maintain the long gun support in a deployed position relative to the ballistic plate 2 and back plate 2. The barrel support is fully deployed by sliding or extending the distal support member 6 outwardly relative to the ballistic plate 3 and back plate 2 on the proximal support member 5.

With the person positioned safely behind the ballistic shield assembly, the distal end portion of the long gun can be placed on the barrel support plate 23 of the barrel support to stabilize the long gun thereby providing an accurate shooting position.

The scope of the invention is defined by the following claims and their physical equivalents.

What is claimed:

1. A ballistic shield assembly configured to protect law enforcement personnel from bullets, said ballistic shield assembly comprising a back plate including a front surface having a protective ballistic shield including a back surface and a front surface attached to said front surface of said back plate and a long gun support mounted to said back plate to support the distal end portion of the long gun of a person positioned behind the ballistic shield assembly wherein said, long gun support comprises a proximal support member movable between a stowed position and a deployed position pivotally coupled to said back plate such that said proximal support member is disposed in a plane rearward of said front surface of said protective ballistic shield when in said stowed position and extends outwardly relative to said front surface of said protective ballistic shield when in said deployed position.

2. The ballistic shield assembly of claim 1 wherein said proximal support member is disposed substantially parallel to said back plate when in said stowed position and is disposed substantially perpendicular to said back plate when in said deployed position.

3. The ballistic shield assembly of claim 1 wherein said long gun support further includes a distal support member movable between a stowed position and a deployed position such that said distal support member is disposed substantially parallel side to side relationship with said proximal support member when each is in said stowed position and said distal support member is adjustably coupled to said proximal support member to extend said distal support member outwardly from said proximal support member relative to said back plate when said proximal support member and said distal support member are each in said deployed position.

4. The ballistic shield assembly of claim 1 further including a stop attached to said base plate to engage said proximal support member when said proximal support member is in said deployed position.

5. The ballistic shield assembly of claim 3 further including a barrel support attached to said distal support member to support the distal portion of the barrel of the long gun when said distal support member is in said deployed and extended positions.

6. The ballistic shield assembly of claim 5 wherein said barrel support comprises a barrel support plate having a limit formed on each side thereof to restrict lateral movement of the barrel of the long gun when resting on said barrel support plate.

7. The ballistic shield assembly of claim 1 wherein said protective ballistic shield comprises an outer ballistic plate and an inner backing plate.

8. The ballistic shield assembly of claim 3 further including a stop attached to said base plate to engage said proximal support member when said proximal support member and said distal support member are each in said deployed position.

9. A ballistic shield assembly configured to protect law enforcement personnel from bullets, said ballistic shield assembly comprising a back plate including a front surface and back surface having a ballistic plate including impact side and a non-impact side said back plate and along gun support mounted to said back plate to support the distal end portion of the long gun of a person positioned behind the ballistic shield assembly including at least one connector attached to said back surface of said protective ballistic shield to detachably couple said protective ballistic shield to said back plate.

10. The ballistic shield assembly of claim 9 wherein said connector comprises a post having a post a recess formed therein to receive a fastener to detachably secure said protective ballistic shield to said back plate.

11. A ballistic shield assembly configured to protect law enforcement personnel from bullets, said ballistic shield assembly comprising a base plate including a front surface and a back surface, a ballistic plate including an impact side and a non-impact side and means disposed between non-impact side of said ballistic plate and said front surface of said base plate to detachably couple said ballistic plate to said base plate to permit removal and replacement of said ballistic plate from said back plate.

12. The ballistic shield assembly of claim 11 wherein said means to detachably couple said ballistic plate to said back plate does not protrude through said ballistic plate.

13. The ballistic shield assembly of claim 3 further including a stop attached to said base plate to engage said proximal support member when said proximal support member and said distal support member are each in said deployed position.

* * * * *